United States Patent
Ryoo et al.

(10) Patent No.: US 9,223,405 B2
(45) Date of Patent: Dec. 29, 2015

(54) APPARATUS AND METHOD FOR INPUTTING INFORMATION BASED ON EVENTS

(75) Inventors: Dong Wan Ryoo, Daejeon (KR); Jun Seok Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 320 days.

(21) Appl. No.: 13/420,407

(22) Filed: Mar. 14, 2012

(65) Prior Publication Data

US 2012/0235906 A1 Sep. 20, 2012

(30) Foreign Application Priority Data

Mar. 16, 2011 (KR) .................... 10-2011-0023482

(51) Int. Cl.
- *G06F 3/01* (2006.01)
- *G06F 3/0346* (2013.01)
- *G06F 3/0488* (2013.01)

(52) U.S. Cl.
CPC .............. *G06F 3/017* (2013.01); *G06F 3/0346* (2013.01); *G06F 3/04883* (2013.01)

(58) Field of Classification Search
USPC ................ 345/156, 158; 340/573.1; 382/103; 463/36
See application file for complete search history.

(56) References Cited

U.S. PATENT DOCUMENTS

| | | | |
|---|---|---|---|
| 4,988,981 A * | 1/1991 | Zimmerman et al. | 345/158 |
| 5,454,043 A * | 9/1995 | Freeman | 382/168 |
| 5,801,704 A | 9/1998 | Oohara et al. | |
| 6,515,669 B1 * | 2/2003 | Mohri | 345/474 |
| 7,092,785 B2 * | 8/2006 | Alsio et al. | 700/168 |
| 7,158,118 B2 | 1/2007 | Liberty | |
| 2008/0068195 A1 * | 3/2008 | Ritter et al. | 340/669 |
| 2009/0103780 A1 * | 4/2009 | Nishihara | G06F 3/017 382/103 |
| 2009/0267898 A1 * | 10/2009 | Yamamoto et al. | 345/158 |
| 2011/0080339 A1 * | 4/2011 | Sun | G06F 3/017 345/157 |
| 2011/0102570 A1 * | 5/2011 | Wilf | G06F 3/017 348/77 |
| 2011/0199292 A1 * | 8/2011 | Kilbride | 345/156 |
| 2011/0199303 A1 * | 8/2011 | Simpson | 345/158 |
| 2011/0199305 A1 * | 8/2011 | Suh | 345/158 |

FOREIGN PATENT DOCUMENTS

| | | |
|---|---|---|
| JP | 07-028591 A | 1/1995 |
| KR | 1020050060606 A | 6/2005 |
| KR | 1020050086164 A | 8/2005 |
| KR | 1020100069322 A | 6/2010 |

* cited by examiner

*Primary Examiner* — Linh N Hoffner
(74) *Attorney, Agent, or Firm* — H.C. Park & Associates, PLC

(57) ABSTRACT

Disclosed are an apparatus and a method for inputting events. An embodiment of the present invention can generate left and right click events in addition to activating and stopping pointers by sensing a rolling of a wrist and calculate and output a coordinate displacement according to the motion of the hand at the time of activating the pointers according to the events. Further, the embodiment of the present invention can be applied to a large-sized display or a contactless spatial input apparatus of an HMD, entertainment such as games, and the like, and can overcome restricted environments by a gesture input scheme under special environment.

9 Claims, 5 Drawing Sheets

(a)

(b)

(a)

(b)

APPARATUS AND METHOD FOR INPUTTING INFORMATION BASED ON EVENTS

CROSS-REFERENCES TO RELATED APPLICATIONS

The present application claims priority under 35 U.S.C 119(a) to Korean Application No. 10-2011-0023482 filed on Mar. 16, 2011 in the Korean Intellectual Property Office, which is incorporated herein by reference in its entirety as set forth in full.

BACKGROUND

Exemplary embodiments of the present invention relate to an apparatus and a method for inputting information based on events, and more particularly, to an apparatus and a method for inputting information based events capable of sensing a rolling of a wrist and receiving a coordinate displacement due to a motion of a hand according to the events.

Generally, as an apparatus for selecting and inputting commands, auxiliary apparatuses such as a keyboard, a mouse, a joystick, and the like, have been used.

The mouse is mainly used being put on flat places such as a desk, a mouse pad, and the like, and may change or a position of an object to be ordered such as a cursor, and the like, or input specific commands by rolling a ball that is disposed at a bottom thereof or using a photo sensor.

Meanwhile, the joystick has a large volume and thus, has a difficulty in carrying so as to be used at the outdoors. Further, the joystick has a difficulty in performing a lively play at the time of playing games and thus, has inconvenience of using separate direction keys.

In addition, as a use of a portable terminal is increased, an auxiliary apparatus capable of selecting data while a user freely moving at the outdoors has been demanded. However, most of the currently used mice are used being put on the bottom and thus, a function thereof are insufficient to be used as the auxiliary apparatus capable of supporting a next-generation technology.

Recently, a body attachable spatial information input apparatus that is a type of being attached and used to a body, such as a watch type, a ring type, a glove type, and the like, has been developed. The body attachable spatial information input apparatus is attached to a portion of a body of a user in a three-dimensional space to input information according to a body motion of a user that is sensed by an inertial sensor (or, an acceleration sensor).

The above-mentioned technology means a background art of the technology field to which the present invention belongs rather than meaning the related art.

As such, the body attachable spatial information input apparatus has a difficulty in adding physical buttons and as a result, is mainly manufactured in a form relying on a position of a thumb, such that a structure or a configuration thereof may be limited.

Further, button events of the spatial information input apparatus using the inertial sensor are unexpectedly shaken since the buttons in space are pressed unlike a two-dimensional mouse apparatus used being put on the bottom. The shaking generates an output of the inertial sensor, which leads to a problem of generating the unintended input.

Further, the unintended input deviates from a position on an originally planned trace, which leads to problem (that is, a problem of focus shaking) of generating the button events at different positions.

SUMMARY

An embodiment of the present invention is directed to an apparatus and a method for inputting information based on events capable of generating left and right click events in addition to activating and stopping pointers by sensing a rolling of a wrist and calculating and outputting a coordinate displacement according to a motion of a hand at the time of activating the pointers according to the events.

An embodiment of the present invention relates to an apparatus for inputting information based on events, including: an inertial sensor unit configured to sense a rolling of a wrist and a motion of a hand; an event determination unit configured to determine the events through the rolling of the wrist sensed by the inertial sensor unit; a coordinate calculation unit configured to calculate a moving displacement for the motion of the hand sensed by the inertial sensor unit; and a control unit configured to transmit control commands corresponding to the events and transmit coordinate values for the moving displacement input from the coordinate calculation unit, when the event determination unit determines the rolling of the wrist as the events.

The inertial sensor unit may measure a slope, acceleration, angular velocity according to the rolling of the wrist and the motion of the hand.

The apparatus for inputting information based on events may further include: a feedback generation unit configured to inform the event generation when the event determination unit determines the rolling of the wrist as the events and the control unit outputs the control commands.

The apparatus for inputting information based on events may further include: a data storage unit configured to store the rolling of the wrist for determining the events and store the control commands according to the events.

The apparatus for inputting information based on events may further include: a communication unit configured to transmit the control commands and the coordinate values transmitted from the control unit to electronic devices.

The event determination unit may determine the rolling of the wrist as a pointer activation event when the rolling of the wrist is generated in one direction in a pointer stopping state and determine the rolling of the wrist as a pointer stopping events when the rolling of the wrist is generated in another direction at a pointer activation state, and determine the rolling of the wrist as a left click event when the rolling of the wrist is generated to the left and then, is generated and recovered to the right within a setting time and determine the rolling of the wrist as a right click event when the rolling of the wrist is generated to the right and then, is generated and recovered to the left within the setting time.

The control unit may output the coordinate values for the moving displacement when the event is the pointer activation event and stop the output of the coordinate values when the events are the pointer stopping event.

Another embodiment of the present invention relates to a method for inputting information based on events, including: sensing a rolling of a wrist and a motion of a hand; determining event generation based on the rolling of the wrist; calculating a moving displacement by the motion of the hand; and outputting control commands corresponding to the events and outputting coordinate values for the moving displacement according to the events, when the event generation is determined and thus, the events are generated.

The method for inputting information based on events may further include: when the control commands are output, outputting a feedback signal informing the event generation.

The determining of the event generation may determine the rolling of the wrist as a pointer activation event when the rolling of the wrist is generated in one direction in a pointer stopping state and determine the rolling of the wrist as a pointer stopping events when the rolling of the wrist is generated in another direction at a pointer activation state, and determine the rolling of the wrist as a left click event when the rolling of the wrist is generated to the left and then, is generated and recovered to the right within a setting time and determine the rolling of the wrist as a right click event when the rolling of the wrist is generated to the right and then, is generated and recovered to the left within the setting time.

At the outputting of the coordinate values for the moving displacement, the coordinate values for the moving displacement may be output when the event is the pointer activation event and the output of the coordinate values may stop when the events is the pointer stopping event.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
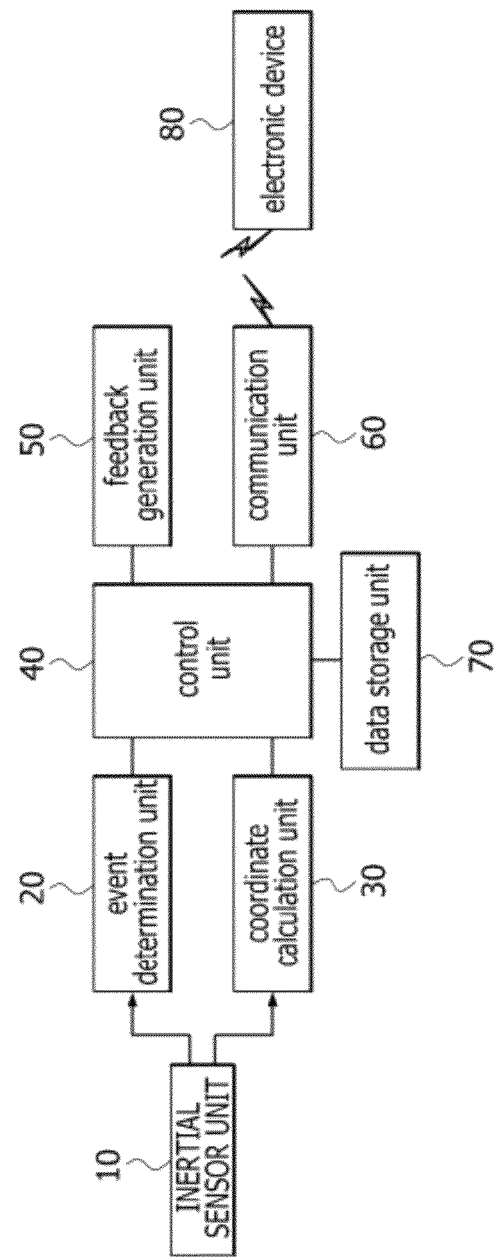
FIG. 1 is a block configuration diagram illustrating AN apparatus for inputting information based on events in accordance with an embodiment of the present invention.

Hereinafter, an apparatus and a method for inputting information based on events in accordance with an embodiment of the present invention will be described with reference to the accompanying drawings. In describing the embodiment, a thickness of lines illustrated in the drawings, a size of components, etc., may be exaggeratedly illustrated for clearness and convenience of explanation. In addition, terms described to be below are terms defined in consideration of functions in the present invention, which may be changed according to the intention or practice of a user or an operator. Therefore, these terms will be defined based on contents throughout the specification.

FIG. 1 is a block configuration diagram illustrating an apparatus for inputting information based on events in accordance with an embodiment of the present invention.

As illustrated in FIG. 1, the apparatus for inputting information is configured to include an inertial sensor unit 10, an event determination unit 20, a coordinate calculation unit 30, and a control unit 40. In addition, the apparatus for inputting information is configured to further include a feedback generation unit 50, a communication unit 60, and a data storage unit 70.

The inertial sensor unit 10 measures slope, acceleration, angular velocity according to a rolling of a wrist and a motion of a hand and outputs the measured slope, acceleration, angular velocity to the event determination unit 20 and the coordinate calculation unit 30.

The inertial sensor unit 10 senses the rolling of the wrist for events and outputs the sensed rolling of the wrist to the event determination unit 20 and senses the motion of the hand for moving coordinates and outputs the sensed motion of the hand to the coordinate calculation unit 30.

The event determination unit 20 receives the rolling of the wrist sensed by the inertial sensor unit 10 for determining the events and determines the events.

The events may be defined by a change in the roll of the wrist, that is, pointer activation, pointer stopping, a left click and a right click, and the like, by sensing the rotation of the wrist.

For example, it may be determined that the event is the pointer activation event when the rolling of the wrist is generated in one direction in the state in which the pointer stops and the event is the pointer stopping event when the rolling of the wrist is generated in another direction in the state in which the pointer is activated.

In addition, when the rolling of the wrist is generated to the left and then, is generated to the right within a setting time, it is determined that the event is the left click event when the rolling of the wrist is recovered and when the rolling of the wrist is generated to the right and then, is generated to the left within a setting time, it is determined that the event is the right click event when the rolling of the wrist is recovered.

The coordinate calculation unit 30 calculates the moving displacement for the motion of the hand sensed by the inertial sensor unit 10 for coordinates for the movement of the pointer.

The control unit 40 transmits a control command corresponding to the events and coordinate values for the moving displacement input from the coordinate calculation unit 30 when being determined as the event in the event determination unit 20.

In this case, the control commands corresponding to the events include the pointer activation, the pointer stopping, the left click and the right click and only when the control command is the pointer activation, the coordinate value for the moving displacement is output and when the pointer stops, the output of the coordinate value may also stop.

In addition, the feedback generator 50 generates vibration to tactually feedback and recognize that the events are generated through the roll of a user when a control command is output from the control unit 40 as the rolling of the wrist is determined as the events in the event determination unit 20.

Meanwhile, the feedback generator 50 may inform that the events are generated by outputting vibration and sound as the feedbacks for informing that the events are generated.

The data storage unit 70 stores the control commands according to the rolling of the wrist and the events for determining the events to newly define the events corresponding to the control command and store the rolling, thereby adding the control command or changing the events.

The communication unit 60 transmits the control command and the coordinate values transmitted from the control unit 40 to electronic devices 80.

The communication unit 60 communicates with the electronic devices 80 through local area wireless communication such as RF scheme, Bluetooth, and the like to serve as a mouse of the electronic device 80.

The apparatus for inputting information based on events configured as described above measures a slope, acceleration, and angular velocity according to the rolling of the wrist and the motion of the hand sensed by the inertial sensor unit 10 that is put on the wrist of a user. The measured slope, acceleration, angular velocity determine the events based on the rolling stored in the data storage unit 70 by the event determination unit 20 and calculates the moving displacement for the motion of the hand by the coordinate calculation unit 30. Thereafter, when the motion of the hand is determined to be the events, the control unit 40 may output the control commands corresponding to the events and output the feedback signals and outputs the moving displacement as the coordinate values of the pointer so as to recognize that the events are generated by the feedback generation unit 50. The control command and the coordination value are transmitted to the electronic device 80 through the communication unit 60 so as to serve as the mouse as the apparatus for inputting information of the electronic device 80.

Figure 2:
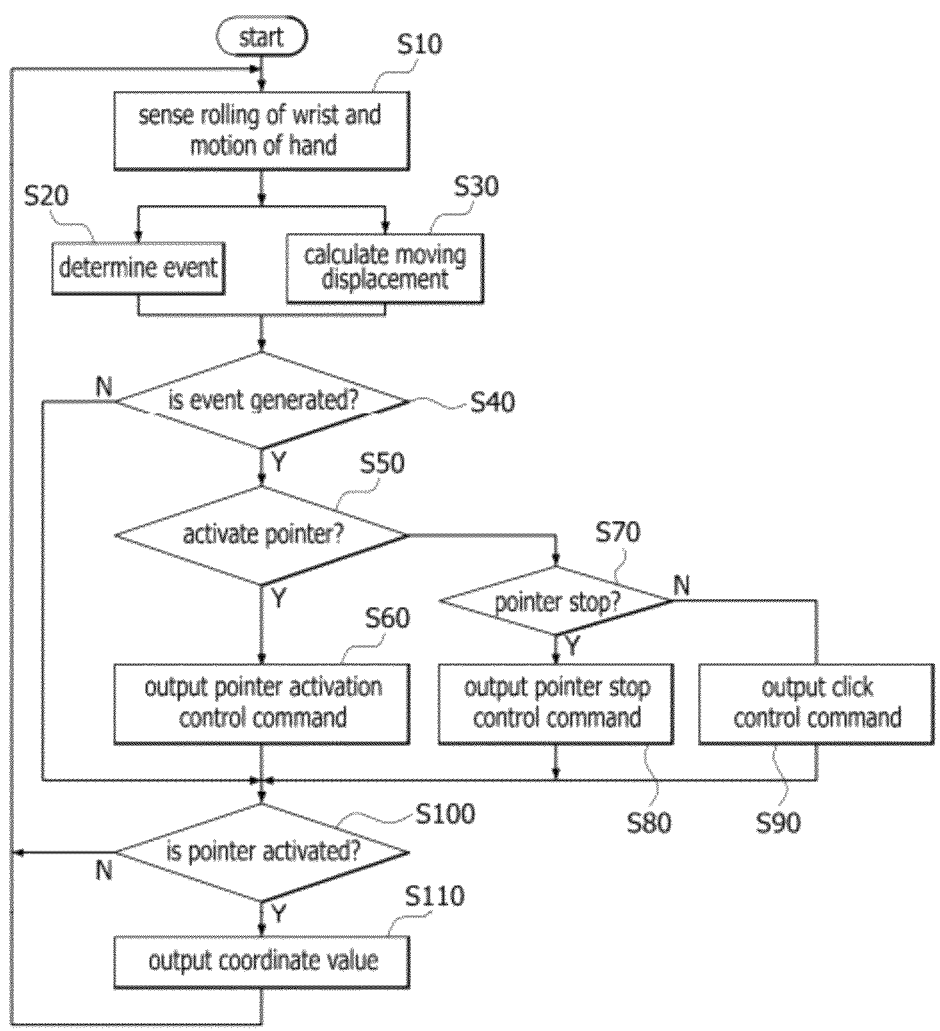
FIG. 2 is a flow chart for describing a method for inputting information based events in accordance with an embodiment of the present invention.
Figure 3:
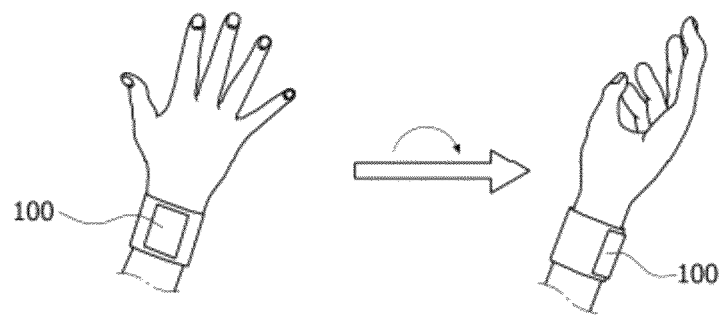
FIG. 3 is a diagram illustrating pointer activation events as events in accordance with an embodiment of the present invention.
Figure 3:
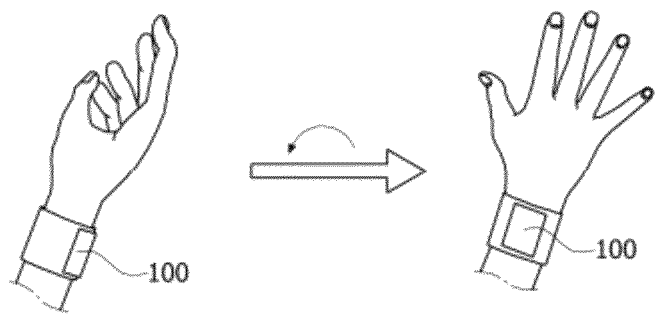
Figure 4:
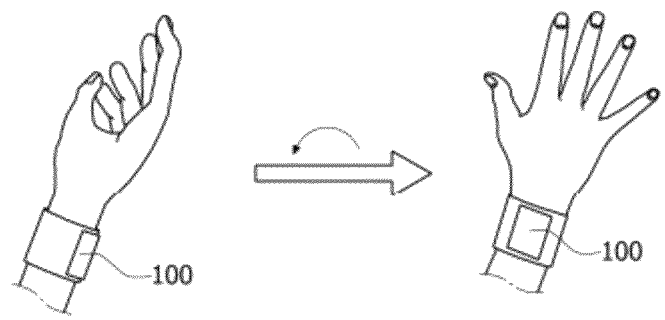
FIG. 4 is a diagram illustrating pointer stopping events as the events in accordance with the embodiment of the present invention.
Figure 4:
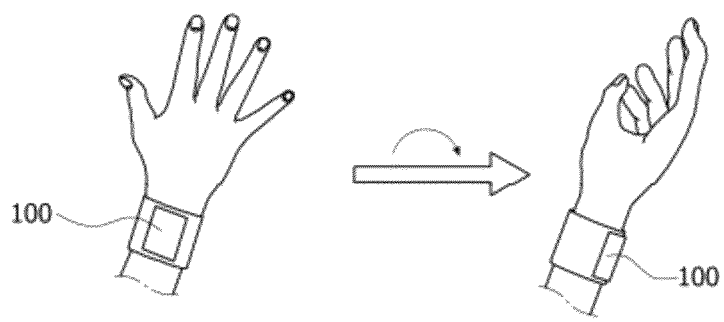
Figure 5:
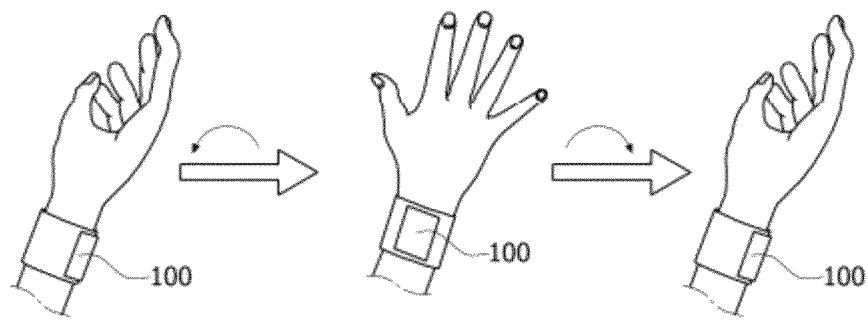
FIG. 5 is a diagram illustrating left click events as the events in accordance with the embodiment of the present invention.
Figure 6:
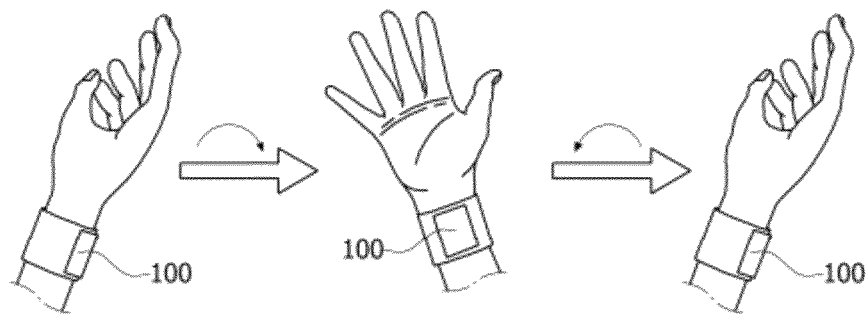
FIG. 6 is a diagram illustrating a right click event as the event in accordance with the embodiment of the present invention.

FIG. 2 is a flow chart for describing a method for inputting information based events in accordance with an embodiment of the present invention, FIG. 3 is a diagram illustrating pointer activation events as events in accordance with an embodiment of the present invention, FIG. 4 is a diagram illustrating pointer stopping events as the events in accordance with the embodiment of the present invention, FIG. 5 is a diagram illustrating left click events as the events in accordance with the embodiment of the present invention, and FIG. 6 is a diagram illustrating right click events as the events in accordance with the embodiment of the present invention.

As illustrated in FIG. 2, a method for inputting information based on events in accordance with the embodiment of the present invention measures a slope, acceleration, and angular velocity according to the rolling of the wrist and the motion of the hand by the inertial sensor unit 10 in a state in which the apparatus for inputting information based on events is put on a wrist.

The rolling of the wrist senses the rotation of the wrist based on a slope, acceleration, and angular velocity that are measured by the inertial sensor unit 10 (S10).

As described above, the event generation is determined based on the rolling of the wrist (S20).

As illustrated in FIGS. 3 to 6, the pointer activation, as the events for the rolling of the wrist, the pointer stopping, and the left click and right click are defined and determined by the rotation of the wrist in the state in which the apparatus for inputting information is put on a wrist.

In the embodiment of the present invention, the events for pointer stopping, and the left click and right click are defined and different events may also be defined.

For example, FIG. 3 is a diagram illustrating the pointer activation events. As illustrated in FIG. 3A, the pointer activation event may define the pointer activation event as an operation of standing a hand blade by rotating the palm of a right hand to the right in the state in which the palm of the right hand faces downwardly. In addition, as illustrated in FIG. 3B, the pointer activation event may be defined as an operation of facing the palm downwardly by rotating the hand to the left in the state in which the right hand blade is stood.

As described above, the pointer activation event may be defined by the case in which the rolling of the wrist is generated to one direction in the state in which the pointer stops.

In FIG. 3, the embodiment of the present invention may be described based on the right hand but may be described based on the left hand.

FIG. 4 is a diagram illustrating the pointer stopping event. As illustrated in FIG. 4A, the pointer stopping event may be defined as the operation of facing the palm downwardly by rotating the right hand to the left in the state in which the right hand blade is stood. In addition, as illustrated in FIG. 4B, the pointer stopping event may be defined as an operation of standing the hand blade by rotating the hand to the right in the state of facing the palm of the right hand downwardly.

As described above, the pointer stopping event may be defined by the case in which the rolling of the wrist is generated to another direction in the state of the pointer activation.

Similar to FIG. 3, in FIG. 4, the embodiment of the present invention may be described based on the right hand but may be described based on the left hand.

As described above, the pointer activation and the pointer stopping event are defined by the case in which the roll of the wrist rotates by 90° to any one of the left and right sides and may be defined to rotate in a direction opposite to each other. That is, when the pointer activation event is defined by the case in which the wrist rotates to the right as illustrated in FIG. 3A, the pointer stopping event needs to be defined by the case in which the wrist rotates to the left as illustrated in FIG. 4A.

FIG. 5 is a diagram illustrating the left click event, which may be defined as the operation of standing the hand blade by facing the palm downwardly by rotating the right hand to the left in the state in which the right hand blade is stood and then, standing the hand blade by rotating the right hand to the right.

FIG. 6 is a diagram illustrating the right click event, which may be defined as the operation of standing the hand blade by facing the palm upwardly by rotating the right hand to the right in the state in which the right hand blade is stood and then, standing the hand blade by again rotating the left hand to the left.

As described above, the left click is defined as the operation of rolling the wrist to the left and generating and recovering the rolling of the wrist to the right within the setting time and the right click is defined as the operation of rolling the wrist to the right and generating and recovering the rolling of the wrist to the left within the setting time, which may also be similarly applied to the left hand rather than the right hand, as illustrated in FIGS. 5 and 6.

As illustrated in FIGS. 3 to 6, the event generation is determined based on the rolling of the wrist, while the moving displacement is calculated by the motion of the hand based on the slope, acceleration, and angular velocity measured by the inertial sensor unit (S30).

When the event defined as described above is generated through the rolling of the wrist, the control commands corresponding to the events, that is, the pointer activation, the pointer stopping, and the left click and right click events are output.

For example, when the generated event is the pointer activation (S50), the pointer activation control command is output to activate the pointers (S60). Thereafter, as the pointer maintains the activation state, the coordinate value for the moving displacement is output by the motion of the hand (S100) (S110).

However, when the generated event is the pointer stopping (S70), the pointer stopping control command is output to stop the pointer (S80).

As described above, when the pointer stops, the coordinate values for the moving displacement is not output (S100).

Meanwhile, when the generated event is the left click or the right click that is not the pointer activation or the pointer stopping (S70), the left click or right click control command is output (S90).

In the case of the left click and the right click, the coordinate value for the moving displacement is output as the event generated in the state in which the pointer is generated in the activation state (S100) (S110).

When the control command corresponding to the event is output, the feedback signal informing that the event is generated is output and thus, the event generated through the roll of the user is tactually or acoustically output, such that the event generation may be informed.

As set forth above, the embodiments of the present invention can generate the left and right click events in addition to activating and stopping the pointers by sensing the rolling of a wrist and calculate and output the coordinate displacement according to the motion of the hand at the time of activating the pointers according to the events.

Further, the embodiments of the present invention can be applied to the large-sized display or the contactless spatial input apparatus of the HMD, entertainment such as games, and the like, and can overcome the restricted environments by the gesture input scheme under the special environment.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An apparatus for inputting information based on events, comprising:
    an inertial sensor unit configured to sense a rolling of a wrist and a motion of a hand;
    an event determination unit configured to determine the events solely through the rolling of the wrist sensed by the inertial sensor unit;
    a coordinate calculation unit configured to calculate a moving displacement for the motion of the hand sensed by the inertial sensor unit; and
    a control unit configured to transmit control commands corresponding to the events and transmit coordinate values for the moving displacement input from the coordinate calculation unit, when the event determination unit determines the rolling of the wrist as the events,
    wherein the event determination unit is configured to determine the rolling of the wrist as a pointer activation or deactivation event, and is configured to determine the rolling of the wrist as click events during pointer deactivation,
    wherein the inertial sensor unit is disposed on single wrist, and
    wherein the event determination unit:
        is configured to determine the rolling of the wrist as a pointer activation event when the rolling of the wrist is generated in one direction in a pointer stopping state and determine the rolling of the wrist as a pointer stopping event when the rolling of the wrist is generated in another direction at a pointer activation state, and
        is configured to determine the rolling of the wrist as a left click event when the rolling of the wrist is generated to the left and then, is generated and recovered to the right within a set time and determine the rolling of the wrist as a right click event when the rolling of the wrist is generated to the right and then, is generated and recovered to the left within the set time.

2. The apparatus for inputting information based on events of claim 1, wherein the inertial sensor unit measures a slope, acceleration, angular velocity according to the rolling of the wrist and the motion of the hand.

3. The apparatus for inputting information based on events of claim 1, further comprising: a feedback generation unit configured to inform the event generation when the event determination unit determines the rolling of the wrist as the events and the control unit outputs the control commands.

4. The apparatus for inputting information based on events of claim 1, further comprising: a data storage unit configured to store the rolling of the wrist for determining the events and store the control commands according to the events.

5. The apparatus for inputting information based on events of claim 1, further comprising: a communication unit configured to transmit the control commands and the coordinate values transmitted from the control unit to an electronic device.

6. The for inputting information based on events of claim 1, wherein the control unit outputs the coordinate values for the moving displacement when the event is the pointer activation event and stops the output of the coordinate values when the events are the pointer stopping event.

7. A method for inputting information based on events, comprising:
    sensing a rolling of a wrist and a motion of a hand;
    determining event generation solely based on the rolling of the wrist;
    calculating a moving displacement by the motion of the hand; and
    outputting control commands corresponding to the events and outputting coordinate values for the moving displacement according to the events, when the event generation is determined and thus, the events are generated,
    wherein the determining event generation comprises determining the rolling of the wrist as a pointer activation or deactivation event, and is configured to determine the rolling of the wrist as click events during pointer deactivation,
    wherein the inertial sensor unit is disposed on single wrist, and
    wherein determining event generation further comprises:
        determining the rolling of the wrist as a pointer activation event when the rolling of the wrist is generated in one direction in a pointer stopping state and determining the rolling of the wrist as a pointer stopping events when the rolling of the wrist is generated in another direction at a pointer activation state, and
        determining the rolling of the wrist as a left click event when the rolling of the wrist is generated to the left and then, is generated and recovered to the right within a set time and determining the rolling of the wrist as a right click event when the rolling of the wrist is generated to the right and then, is generated and recovered to the left within the set time.

8. The method of claim 7, further comprising: when the control commands are output, outputting a feedback signal informing the event generation.

9. The method of claim 7, wherein at the outputting of the coordinate values for the moving displacement, the coordinate values for the moving displacement are output when the event is the pointer activation event and the output of the coordinate values stops when the events is the pointer stopping event.

* * * * *